United States Patent
Rauch et al.

(10) Patent No.: US 6,940,536 B2
(45) Date of Patent: Sep. 6, 2005

(54) SYSTEM ARCHITECTURE FOR SCAN LINE NON-LINEARITY COMPENSATION IN A ROS SYSTEM

(75) Inventors: Russell B. Rauch, Pasadena, CA (US); Michael B. Neary, Manhattan Beach, CA (US); Mohammad H. Rahnavard, Rancho Palos Verdes, CA (US); Michael J. Thomas, Penfield, NY (US); Thomas M. Baretsky, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 173 days.

(21) Appl. No.: 10/291,923

(22) Filed: Nov. 7, 2002

(65) Prior Publication Data

US 2004/0090522 A1 May 13, 2004

(51) Int. Cl.[7] .............................................. B41J 2/435
(52) U.S. Cl. .................................................... 347/249
(58) Field of Search ................................. 347/234–235, 347/243, 248–250, 252, 260, 261; 327/262

(56) References Cited

U.S. PATENT DOCUMENTS

| 4,257,053 | A | * | 3/1981 | Gilbreath | 347/261 |
|---|---|---|---|---|---|
| 4,494,021 | A | * | 1/1985 | Bell et al. | 327/262 |
| 5,291,392 | A | * | 3/1994 | Gerber et al. | 700/56 |
| 6,092,939 | A | * | 7/2000 | Nishikori et al. | 400/61 |
| 6,178,031 | B1 | | 1/2001 | Rauch et al. | 359/216 |
| 6,529,643 | B1 | * | 3/2003 | Loce et al. | 382/300 |

* cited by examiner

Primary Examiner—Hai Pham
(74) Attorney, Agent, or Firm—Oliff & Berridge, PLC

(57) ABSTRACT

A system architecture for scanned non-linearity correction in a printer uses any raster output scanner having scanned non-linearity profile previously stored in memory from a test station installed with any pixel board. The pixel board includes a correction table register wherein the pixel board utilizes the scanned non-linearity profile of the raster output scanner to calculate the correction table register to correct for pixel misregistration.

20 Claims, 5 Drawing Sheets

SYSTEM ARCHITECTURE FOR SCAN LINE NON-LINEARITY COMPENSATION IN A ROS SYSTEM

BACKGROUND

The present invention relates to a system architecture for scan line non-linearity in a Raster Output Scanning (ROS) system and, more particularly, to a system architecture that enables correction of scan non-linearity and "mix and match" of ROS units and pixel boards at random during the manufacture of printing systems.

Printing systems utilizing lasers to reproduce information are well known in the art. The printer typically uses a Raster Output Scanner (ROS) to expose the charged portions of a photosensitive medium, such as a photoreceptor, to record an electrostatic latent image on the photosensitive medium.

A plurality of ROS units can be used in a color xerographic ROS printer. Each ROS forms a scan line for a separate color image on a common photoreceptor belt. Each color image is developed in overlying registration with the other color images from the other ROS units to form a composite color image that is transferred to an output sheet. Registration of each scan line of the plurality of ROS units requires each image to be registered to within a 0.1 mm circle or within a tolerance of ±0.05 mm.

A typical prior art raster output scanning system 10 of FIG. 1 includes a light source 12 for generating a light beam 14 and scanning means 16 for directing the light beam 14 to a spot 18 at a photosensitive medium 20. The scanning means 16 also serves to move the spot 18 along a scan line 22 of specified length at the photosensitive medium 20. For that purpose, the scanning means 16 in the illustrated scanner system 10 includes a rotatable polygon mirror with a plurality of light reflecting facets 24 (eight facets being illustrated) and other known mechanical components that are depicted in FIG.1 by the polygon 16 rotating about a rotational axis 26 in the direction of an arrow 28.

The light source, 12, such as a laser diode, emits a modulated coherent light beam 14 of a single wavelength. The light beam 14 is modulated in conformance with the image information data stream contained in the video signal sent from image output light source control circuit 30 to the light source 12.

The modulated light beam 14 is collimated by a collimating lens 32, then focused by a cross-scan cylindrical lens 34 to form a line on a reflective facet 24 of the rotating polygon mirror 16.

The polygon mirror 16 is rotated around its axis of rotation by a conventional motor.(not shown), known to those of ordinary skill in the art.

The beam 14 reflected from the facet 24 then passes through the f-theta scan lenses 36 and the anamorphic wobble correction lens 38.

The f-theta scan lens 36 consists of a negative plano-spherical lens 40, a positive plano-spherical lens 42, and the cross-scan cylinder lens 44. This configuration of f-theta scan lenses has sufficient negative distortion to produce a linear scan beam. The light beam will be deflected at a constant angular velocity from the rotating mirror that the f-theta scan lens optically modifies to scan the surface at a nearly constant linear velocity.

The f-theta scan lens 36 will focus the light beam 14 in the scan plane onto the scan line 22 on the photosensitive medium 20.

After passing through the f-theta scan lens 36, the light beam 14 then passes through a wobble correction anamorphic lens element 38. The wobble correction optical element can be a lens or a mirror and is sometimes referred to as the "motion compensating optics". The purpose of optical element 38 is to correct wobble along the scan line generated by inaccuracies in the polygon mirror/motor assembly.

The wobble correction lens 38 focuses the light beam in the cross-scan plane onto the scan line 22 on the photosensitive medium 20.

As the polygon 16 rotates, the light beam 14 is reflected by the facets 24 through the f-theta and wobble correction lenses and scans across the surface of the photosensitive medium in a known manner along the scan line 22 from a first end 46 of the scan line 22 (Start of Scan or "SOS") past a center (the illustrated position of the spot 18) and on to a second end 48 of the scan line 22 (End of Scan or "EOS"). The light beam exposes an electrostatic latent image on the photosensitive member 20. As the polygon 16 rotates, the exposing light beam 14 is modulated by circuit 30 to produce individual bursts of light that expose a line of individual pixels, or spots 18, on the photosensitive medium 20.

Ideally, the ROS should be capable of exposing a line of evenly spaced, identical pixels on the photosensitive medium 20. However, because of the inherent geometry of the optical system of the ROS, and because manufacturing errors can cause imperfections in the scan optics, obtaining evenly spaced, identical pixels can be problematic.

"Scan non-linearity" refers to variations in pixel placement relative to uniform pixel placement, and this is primarily due to variation of the spot velocity occurring as the spot moves along the scan line during the scan cycle relative. Scan linearity is the measure of how equally spaced the spots are written in the scan direction across the entire scanline. In order to define scan linearity spatially, reference points on the scan line must first be specified: one definition is to consider that the two idealized ends of the scan line have zero error, provided that the delay from SOS to the first active is adjusted correctly (correct margin adjustment) and provided the last pixel of the active scanline is also adjusted correctly (correct magnification adjustment). Active scan is defined as that part of the scan line, which is modulated by the video stream. With the start of active scan and the end of active scan defined as reference points, typical scan linearity curves start at zero position error at one end of the active scan and end with zero position error at the other end of active scan. In between the endpoints of the active scan the non-linearity curve can have a multitude of shapes. Ideally, the curve of non-linearity versus scan distance would be at zero across the entire scanline for perfect pixel placement. From optical modeling for one lens design, the ideal shape would appear as in FIG. 4. In practice the shape may have only one lobe (above or below) the zero non-linearity line, or non-symmetrical lobes that are distorted from the sinusoidal-like appearance and the number of zero crossings of non-linearity of the ROS can vary from unit to unit.

Scan non-linearity is typically caused by system geometry or a velocity variation of the scanning means. The speed at which the focussed exposing light beam travels across the scan line on the photosensitive medium 20 is called the spot velocity.

Without some means to correct for the inherent scan non-linearity caused by the geometry of the ROS system, the spot velocity will vary as the light beam scans across the photosensitive medium. The video input of some raster output scanners compensate for such non-linearity electronically using a variable frequency pixel clock (sometimes called a scanning clock). The pixel clock produces a pulse train (i.e., a pixel clock signal) that is used to turn the light beam emitted by the light source on and off at each pixel position along the scan line. By varying the clock frequency and thereby the timing of individual pulses in the pulse train serves to control pixel placement along the scan line. On the one hand, if the frequency of the pixel clock signal is constant, the resulting pixels will be advanced or retarded relative to the uniform pixel placement because of scan nonlinearity of the ROS. On the other hand, if a controlled variation of the pixel clock is properly adjusted across the scan, the pixels can be place with minimal deviation from the ideal of equally space pixels. That will more evenly space the pixels and thereby at least partially compensate for what is sometimes called pixel position distortion (i.e., uneven pixel spacing caused by scanner non-linearity).

The pixel clock control circuitry 30 serves as an electronic control system for synchronizing the light beam 14 modulation in order to produce the pixels along the scan line 22. The control system that includes video and pixel clock may, for example, be configured using known components and design techniques to produce a control signal for activating the light beam at each of a plurality of desired pixel positions along the scan line (e.g., the central portion of each pixel position being evenly spaced at ⅟300 inch intervals for 300 dpi resolution or being evenly spaced at ⅟600 inch intervals for 600 dpi resolution, etcetera).

Preferably, the control system is configured so that the control signal defines a pixel interval for each pixel position and so that the pixel interval defined by the control signal varies according to spot velocity, to correct for scan non-linearity as described above. The control system may also synchronize the control signal with spot position by suitable known means, such as by responding to a start-of-scan (SOS) control signal or other synchronizing signal produced by known means, in order to enable alignment of the start of the sequence of pixels in each scanline. This sequence of pixels is delayed by a defined clock count in order to set the edge margin of the active scan scanline. The average clock frequency can also be adjusted to change the scan magnification. If the average clock frequency is increased, the scan magnification is decreased and conversely if the average clock frequency is decreased the scan magnification is increased. The settings of margin and magnification are sensed by marks on the photoreceptor as shown by block 118 in FIG. 7.

FIG. 2 shows a an ideal scan line 100 consisting of a series of pixels 102 uniformly spaced 104 by the pixel clock of the raster output scanning system. These pixels 102 on the scan line 100 are placed on a uniform grid 106 at each clock cycle in the idealized case of perfect scan non-linearity.

FIG. 3 illustrates deviation from the uniform pixel placement of FIG. 2 due to scan non-linearity. The scan line 200 consists of a series of pixels 202 which are displaced by a distance 204 from the uniform pixel placement 206 along the scan line as shown schematically in the graph of FIG. 4.

For color printing system with multiple ROS units the accurate registration of pixels in the fast scan direction is required. The ideal is to place the pixels from each ROS along a uniform grid when the pixel clock frequency is constant. In practice there is a departure from the uniform grid, called scan non-linearity, and this non-linearity profile varies from unit to unit.

Pixel clock frequency variation is used to compensate for this profile. A lookup table is used to control the pixel clock frequency variation, according to a prescribed algorithm. The transfer function of clock frequency change vs. table value also varies among pixel boards. The present invention is a non-linearity correction-system architecture that enables the "mix and match" of a ROS and a pixel board taken at random during the printing system manufacture.

SUMMARY

A system architecture for scanned non-linearity correction in a printer uses any raster output scanner having scanned non-linearity profile previously stored in memory from a test station installed with any pixel board. The pixel board includes a correction table register wherein the pixel board utilizes the scanned non-linearity profile of the raster output scanner to calculate the values in a correction table register to correct for pixel misregistration.

Other objects and attainments together with a fuller understanding of the invention will become apparent and appreciated by referring to the following description and claims taken in conjunction with the accompanying drawings.

DESCRIPTION OF THE DRAWINGS

Figure 1:
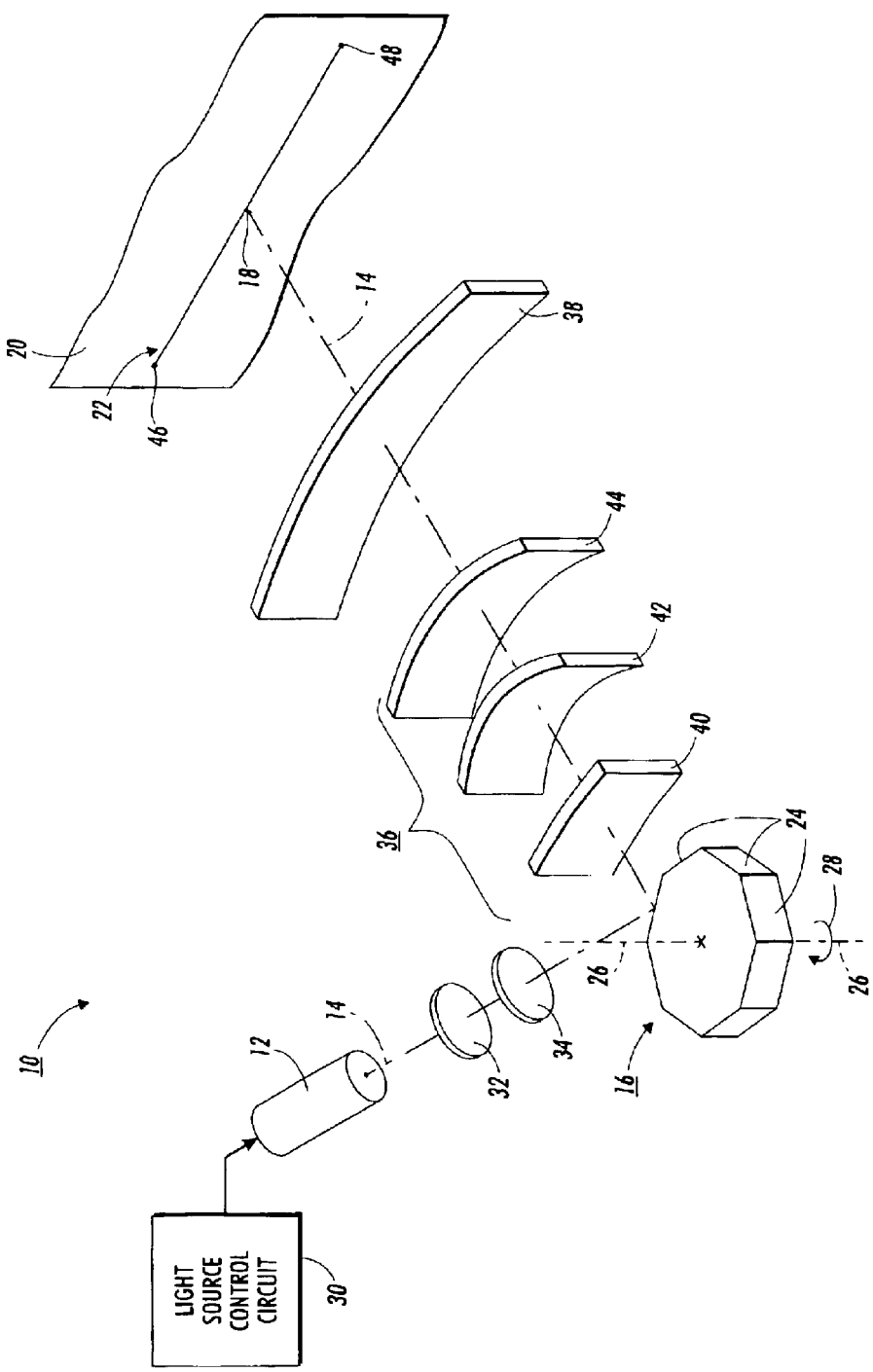
FIG. 1 illustrates a schematic side view of a prior art raster output scanning (ROS) system.
Figure 2:
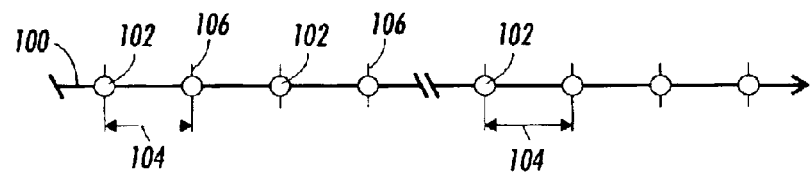
FIG. 2 is a side view of idealized pixel placement along a scan line.
Figure 3:
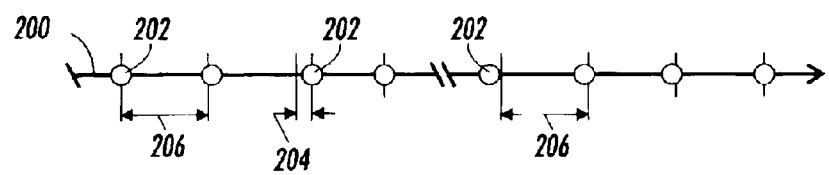
FIG. 3 is a side view of non-linear pixel placement along a scan line.
Figure 4:
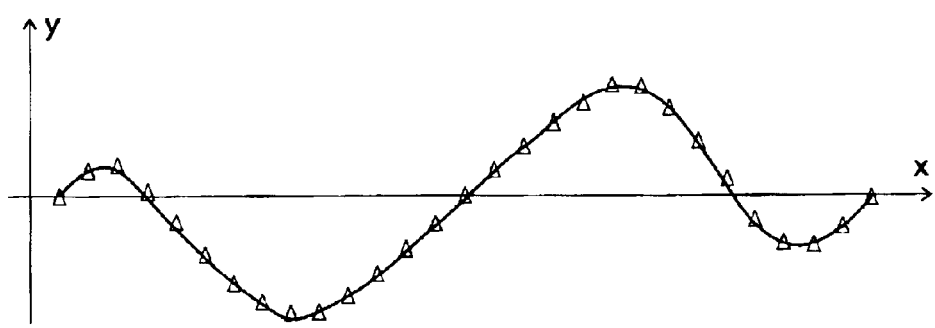
FIG. 4 is a schematic graph of scan non-linearity of the pixel placement of FIG. 3.
Figure 5:
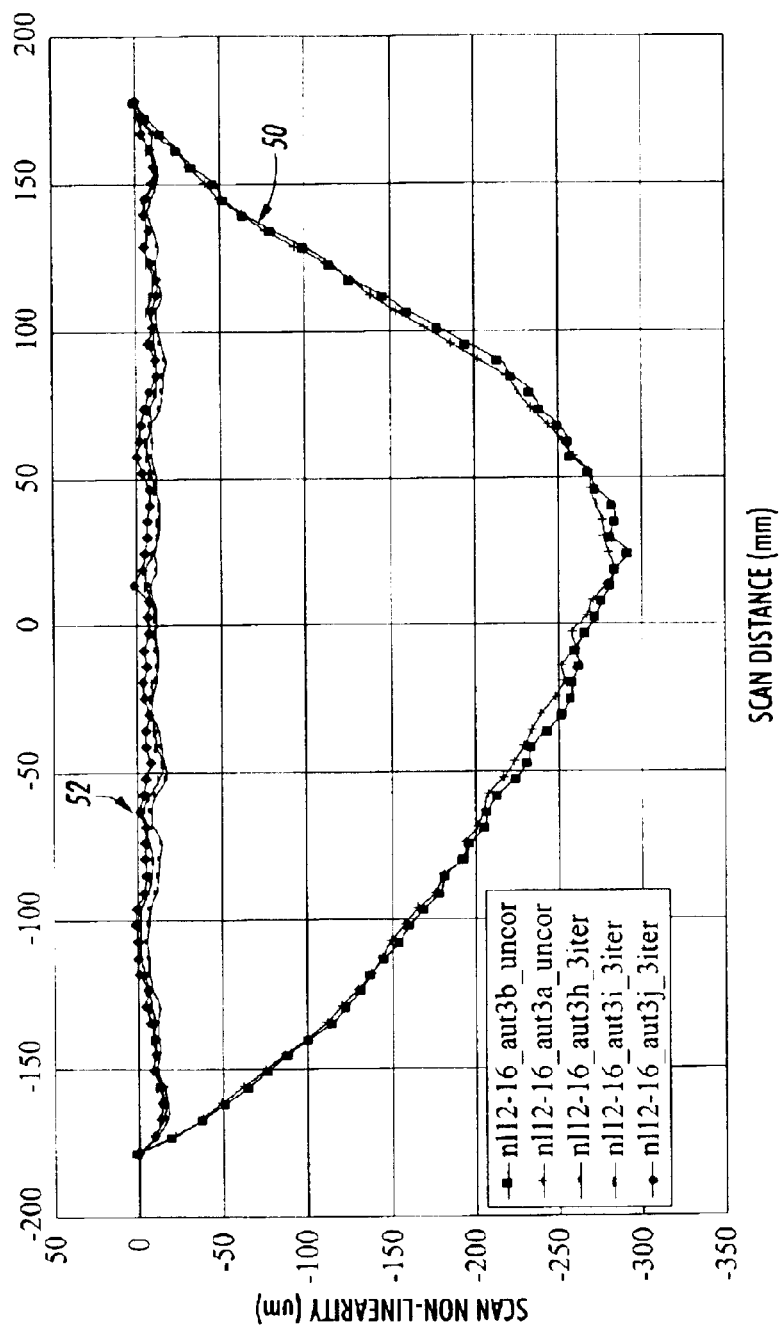
FIG. 5 shows a measured uncorrected non-linearity curve that is used to calculate the frequency modulation of the pixel clock and the measured residual non-linearity after correction by the present invention.
Figure 6:
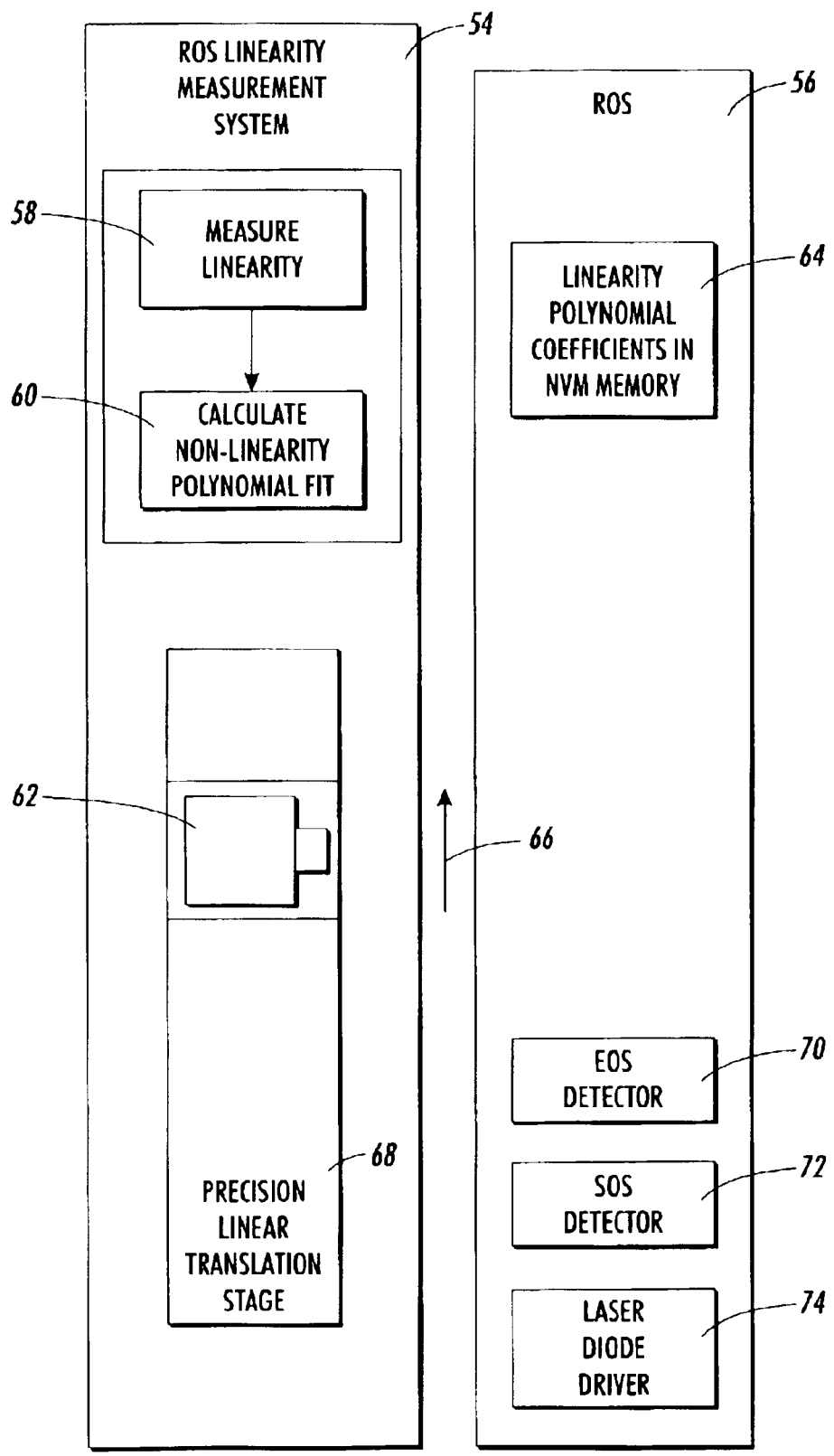
FIG. 6 shows a block diagram of a ROS interface module board and the measurement system to characterize non-linearity which are two components of this invention.

Referring now to FIG. 6, there is shown a ROS Test Station consists of a ROS linearity measurement system 54 for measuring the characteristics of a ROS 56 having exhibiting non-linear characteristics versus scan distance 50 as shown in FIG. 5. As shown schematically in FIG. 6, the ROS linearity measurement system 54 utilizes a CCD camera 62 mounted on a precision linear positioning stage 68. A video signal is generated such that 1-on out of every 128 creates an array of spots across the output scan line 66. The ROS 56 and the measuring system 54 is configured so that there is only spot seen by the camera 62 at a time. The relative position of the spot seen by the camera 62 is determined by measuring the camera position Xcam and the spot centroid Xbar in the camera 62. The spot position X along the scan line 66 is defined in Equation (1) as follows:

$$X = X\text{cam} + X\text{bar} \qquad \text{Equation (1)}$$

The camera 62 is then moved along scan line 66 incrementally by a distance delX;

$$delX = vscan * T128,  \quad \text{Equation (2)}$$

where vscan is the average scanning beam velocity of the ROS 56 and T128 is the incremental time between 128 pixels.

Thus the scan non-linearity Yi 58 at the ith measurement position is defined as:

$$Yi = Xi - X0 - i*(Xn - X0)/n, \quad \text{Equation (3)}$$

where Xi is the position of the ith sample (i=0, 1, 2 . . . , n) along the scanline.

$$vscan = (Xn - X0)/(Tn - T0) \quad \text{Equation (4)}$$

A polynomial is then fit to the data (Xi, Yi) and the derivative coefficients are calculated by a computer 60 within the test measurement system 54. The polynomial derivative coefficients 60 are calculated from the polynomial coefficients and these derivative coefficients are then transferred over a communication line (not shown) from the test measurement system to non-volatile memory (NVM) 64 on the ROS control PWBA. Thus the non-linearity profile information that is unique to the ROS 56 is saved within the ROS 56 having an end of scan (EOS) detector 70, start of scan (SOS) detector 72 and laser diode driver 74 for subsequent installation to a printer (not shown).

Figure 7:
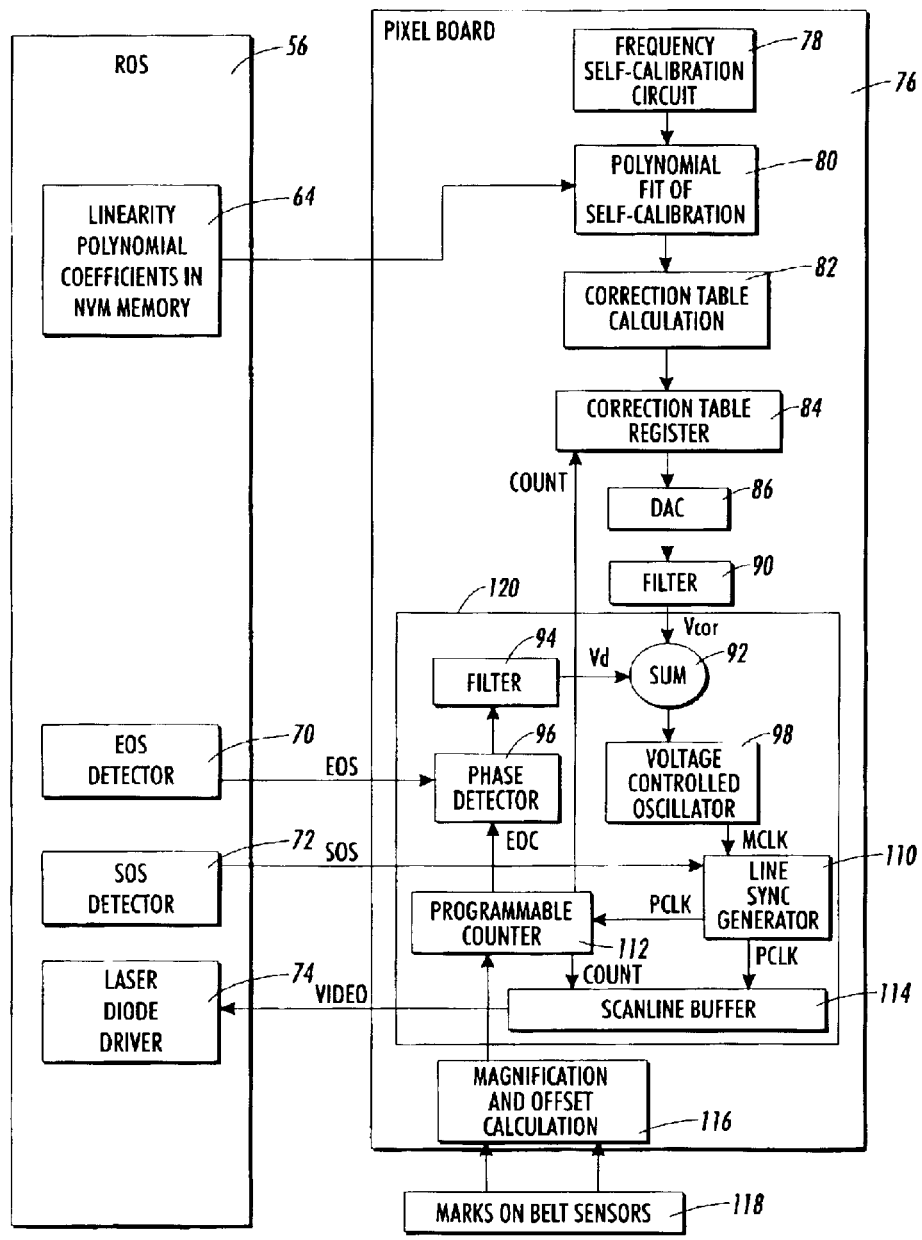
FIG. 7 shows a block diagram of a ROS interface module board of this invention and the pixel board of this invention, which are used in the printer system to electronically correct for scan non-linearity.

Turning now to FIG. 7, a pixel circuit board 76 is connected to the ROS 56 having the linearity derivative polynomial coefficients in NVM 64 during installation. The pixel circuit board 76 includes a variable frequency clock with a frequency self-calibration circuit 78 and an imbedded computer. When ROS 56 and pixel board 76 are installed in a printer (not shown), the non-linearity of the ROS 56 and the calibration 78 of the clock frequency are each unique. The pixel board 76 self-calibrates the clock frequency and then imports the non-linearity coefficients 80 from the ROS 56 over a communication line. Using the non-linearity correction algorithm, and the self-calibration curve of the clock frequency, a lookup table 84 is calculated 82 to adjust the clock frequency as the ROS spot is scanned in a line across the photoreceptor. By speeding up the clock the pixels positions are retarded relative to the beam scanning direction; conversely, by decreasing the clock frequency the pixel placement is advanced relative to the scanning direction. Referring once again to FIG. 5, an example of the linearity correction 52 demonstrated with the ROS 56 and pixel board 76 is shown. Therefore, the non-linearity correction algorithm first implemented on the ROS 56 measurement computer is then ported to the computer on the pixel board 76 wherein the correction is performed using any ROS 56 with any pixel board 76.

Referring once again to FIG. 7, a voltage controlled oscillator (VCO) 98 and a phase locked loop 120 are utilized to generate an accurate main clock Mclk for synchronizing the stream of video data that is sent to the laser diode driver 74. Within the phase locked loop 120, a phase detector 96 receives an end of scan (EOS) signal from the EOS detector 70 and an end of count (EOC) signal from the programmable counter 112. Based on the phase difference of the received signals, the phase detector 96 generates a pulse which is converted to a voltage by a charge pump (not shown) and sent out as a voltage $V_d$ to the voltage controlled oscillator (VCO) 98 through a low pass filter 94 and sum circuit 92. The low pass filter 94 reduces the noise level of the $V_d$ voltage before delivering it to the sum circuit 92. The sum circuit 92 sums the $V_d$ voltage with the voltage vcor that is derived from the value in the correction table register which are converted to the appropriate voltage by DAC 86 and passed through filter 90. The value in the correction table register is chosen based on the corresponding register address value "count" from the programmable counter 112. Count is incremented some integer multiple number of pixels. The voltage level of the $V_d$ controls the frequency of VCO 98. Based on the $V_d$ voltage, VCO 98 (clock generator) generates a main clock Mclk from the line sync generator 110 for delivery to the scanline buffer 114. The line sync generator is synchronized, based upon the input from the SOS detector 72.

The Mclk is sent to a divider to divide the Mclk by M to generate an end of count (EOC). M is the total number of pixels per scan line. By way of example only, for a 14.4 inch paper with 600 pixels per inch, M is 8640. The EOC, which indicates the end of the scan line, is sent to the phase detector 96.

In operation, the phase detector 96 compares the EOC to the EOS. EOS is a signal being generated within the ROS 56. Typically, there are two sensors 70 and 72 placed within a ROS system to detect the start of scan SOS and the end of scan EOS. As the scanning laser light beam passes over a dedicated spot on the scan line immediately prior to pixel placement, the respective sensor generates a start of scan SOS. In the same manner, as the scanning laser light beam passes over a dedicated spot on the scan line immediately after the end of pixel placement, the respective sensor generates an end of scan EOS. The SOS 72 and the EOS 70 are being generated for each scan line. Since the speed of the scanning laser light beam is fixed, the time between the SOS and the EOS is the same for each scan line.

The EOC has to match the EOS. If they do not match, it means the frequency of the main clock Mclk needs to be decreased or increased depending on if the EOC was prior to or after the EOS respectively. Therefore, depending on if EOC is before or after EOS, the phase detector 96 generates either a positive pulse or a negative pulse respectively. The width of the pulse indicates the time difference between the EOS and EOC. Typically, the timing of EOS and EOC do not match. As a result, the phase detector 96 typically generates either a negative or a positive pulse. However, if the timing of EOS and EOC match, the phase detector 96 does not generate a pulse.

In the absence of the pulse from the phase detector 96, a charge pump (not shown), and integrator (also not shown) generate a base voltage and send it as voltage $V_d$ to the VCO 98. When the phase detector 96 generates a pulse, depending on if the pulse is negative or positive, the charge pump subtracts or adds a voltage, proportional to the width of the pulse, from/to the integrator's base voltage and sends the result as voltage $V_d$ to the VCO 98. Initially, $V_d$ is equal to the base voltage since there is no EOC to be compared to the EOS. Therefore, the first $V_d$ causes the VCO 98 to calibrate the frequency of the Mclk to a reference frequency (54 MHz by way of example). Subsequently, at the end of each scan line, depending on if EOC deviates from or matches the EOS, a new or the same $V_d$ will be sent out by the integrator, respectively.

If the same $V_d$ is sent out, the frequency of the Mclk does not change. However, if a new $V_d$ is sent out, the deviation of $V_d$ from the base voltage causes the VCO to re-calibrate the drifted frequency of Mclk back to the reference frequency. The re-calibration of the frequency of Mclk is done only at the end of each scan line and only if the timing of EOC does not match the timing of EOS. After calibration or re-calibration, the frequency of the Mclk stays constant until the next SOS because the integrator provides a fixed voltage $V_d$ to the VCO.

Once scanning of a scan line is started and an SOS signal is generated, the frequency of the main clock Mclk has to be varied to correct the non-linear misregistration of the pixels of each scan line. The frequency of the main clock Mclk will be varied (modulated) based on the predetermined correction curve for each scan line which is stored in the correction table register 84 as described above.

Referring once again to FIG. 7, Mclk is also sent to pixel clock generator within the line sync generator 110, which receives a Sync signal generated by the SOS detector 72. The line sync generator 110 synchronizes the Mclk with SOS signal and sends it out as a pixel clock Pclk to the programmable counter 112. Therefore, Pclk is a clock with the same frequency as the Mclk except it is synchronized to start with SOS. Counter 112 counts the number of pixels and increases the count by receiving each Pclk. The count from counter 112 is sent to the look-up table 84 to indicate which table value of the correction curve needs to be sent out. During the time a scan line is being scanned, the look-up table 84 sends out a respective correction curve to VCO 98 through a D/A converter 86 which converts the digital correction curve to an analog correction voltage and is filtered by filter 90.

This correction voltage $V_{cor}$ from filter 90 is added to the $V_d$ from filter 94 and is delivered to the VCO 98. The correction voltage modulates the frequency of the main clock Mclk as needed along a scan line. This process continues until the entire active scan line is corrected. At the end of scan, an EOC generated reset signal Rst will reset the counter 112. Therefore, the look-up table 84 stops sending out correction curves terminating the frequency modulation of the Mclk. Also at the end of scan, as previously described, if the frequency of the Mclk has drifted away from the reference frequency, it will be re-calibrated. The re-calibration assures that each scan line starts with an identical frequency (reference frequency).

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A system architecture for scanned non-linearity correction in a printer comprising:
   a raster output scanner having scanned a non-linearity profile stored in a memory; and
   a pixel board including a correction table register and a variable frequency clock with a frequency self-calibration circuit; and
   a controller that controls said pixel board to self-calibrate the clock frequency, and then utilizes the scanned non-linearity profile of the raster output scanner and a self-calibration curve of the clock frequency to determine a correction for pixel misregistration.

2. The system architecture according to claim 1 further comprising:
   the memory storing linearity polynomial coefficients.

3. The system architecture according to claim 2 further comprising:
   the memory being a non-volatile memory for storing the linearity polynomial coefficients.

4. The system architecture according to claim 1 further comprising:
   the controller controlling a pixel clock frequency to be constant, and a video pattern being used to create an equally-spaced grid of raster scan spots along a scan line used as a sampling measurement for the non-linearity of the grid.

5. The system architecture according to claim 1 further comprising:
   a CCD camera moved to a nominal grid location by a precision linear stage, a centroid of a spot being measured relative to a center of the CCD camera, and an amount of non-linearity being a difference between the measured position of the centroid in the camera and the nominal grid position.

6. The system architecture according to claim 1 further comprising:
   the controller controlling raster scanner non-linearity during manufacturing testing without printing.

7. The system architecture according to claim 1 further comprising:
   the controller performing linearity correction with any pair of randomly selected raster scanner and pixel boards integrated into a printer.

8. The system architecture according to claim 3 further comprising:
   the controller transferring the linearity polynomial coefficients from the raster scanner non-volatile memory to a pixel board memory.

9. The system architecture according to claim 1 further comprising:
   the controller utilizing an algorithm to calculate for a correction for a pixel clock frequency with a scan time by utilizing linearity polynomial coefficients and calibration constants of a pixel board clock.

10. A system architecture for scanned non-linearity correction in a printer comprising:
    a scanner that scans a non-linearity profile for a raster output scanner;
    a memory that stores the non-linearity profile;
    a variable frequency clock with a frequency self-calibration circuit; and
    a controller that controls a self-calibration of the clock frequency, and then utilizes the scanned non-linearity profile of the raster output scanner and a self-calibration curve of the clock frequency to determine a correction for pixel misregistration on a pixel board.

11. The system architecture according to claim 10 further comprising:
    the controller calculating the correction using linearity polynomial coefficients.

12. The system architecture according to claim 11 further comprising:
    the memory storing the linearity polynomial coefficients.

13. The system architecture according to claim 10 further comprising:
    the controller creating an equally-spaced grid of raster scan spots along a scan line used as a sampling measurement for the non-linearity of the grid.

14. The system architecture according to claim 13 further comprising:
    the controller controlling a pixel clock frequency to be constant when a video pattern is used.

15. The system architecture according to claim 10 further comprising:
    the controller moving a digital camera to a nominal grid location by a precision linear stage, a centroid of a spot being measured relative to a center of the digital camera and amount of non-linearity being a difference between the measured position of the centroid in the digital camera and the nominal grid position.

16. The system architecture according to claim 10 further comprising:

the controller controlling raster scanner non-linearity during manufacturing testing without printing.

17. The system architecture according to claim 10 further comprising:

the controller performing linearity correction with any pair of randomly selected raster scanner and pixel boards integrated into a printer.

18. The system architecture according to claim 10 further comprising:

the controller transferring linearity polynomial coefficients from the raster scanner non-volatile memory to a pixel board memory.

19. The system architecture according to claim 10 further comprising:

the controller calculating a pixel clock frequency with respect to a scan time by utilizing linearity polynomial coefficients and calibration constants of a pixel board clock.

20. A system architecture for scanned non-linearity correction in a printer comprising:

at least one raster output scanner that scans a non-linearity profile stored in a memory; and at least one pixel board that includes a correction table register and a variable frequency clock with a frequency self-calibration circuit that calibrates a frequency clock, said at least one pixel board utilizes the scanned non-linearity profile of the at least one raster output scanner and a self-calibration curve of the clock frequency to determine a correction for pixel misregistration.

* * * * *